United States Patent
Koskinen et al.

(10) Patent No.: US 10,445,135 B2
(45) Date of Patent: Oct. 15, 2019

(54) MIGRATING VIRTUAL MACHINES

(71) Applicant: AJR Solutions Oy, Teijo (FI)

(72) Inventors: Janne Koskinen, Lempäälä (FI); Antti Ristolainen, Teijo (FI)

(73) Assignee: AJR Solutions Oy, Teijo (FI)

( * ) Notice: Subject to any disclaimer, the term of this patent is extended or adjusted under 35 U.S.C. 154(b) by 114 days.

(21) Appl. No.: 15/825,141

(22) Filed: Nov. 29, 2017

(65) Prior Publication Data

US 2018/0150320 A1 May 31, 2018

(30) Foreign Application Priority Data

Nov. 30, 2016 (FI) .................................... 20165910

(51) Int. Cl.
| | |
|---|---|
| *G06F 9/455* | (2018.01) |
| *G06F 9/48* | (2006.01) |
| *G06F 9/50* | (2006.01) |
| *H04L 12/24* | (2006.01) |
| *G06F 11/14* | (2006.01) |

(52) U.S. Cl.
CPC ........ *G06F 9/4856* (2013.01); *G06F 9/45558* (2013.01); *G06F 9/5077* (2013.01); *G06F 11/1448* (2013.01); *H04L 41/22* (2013.01); *G06F 2009/4557* (2013.01); *G06F 2009/45583* (2013.01)

(58) Field of Classification Search
None
See application file for complete search history.

(56) References Cited

U.S. PATENT DOCUMENTS

| | | | | |
|---|---|---|---|---|
| 7,313,793 | B2 * | 12/2007 | Traut .................... | G06F 9/4856 718/1 |
| 7,577,722 | B1 * | 8/2009 | Khandekar ......... | G06F 9/45558 709/220 |
| 8,307,187 | B2 * | 11/2012 | Chawla ................ | G06F 9/5077 711/173 |
| 8,429,651 | B2 * | 4/2013 | Donnellan .......... | G06F 9/45558 718/1 |

(Continued)

OTHER PUBLICATIONS

Hirofuchi et al "A Live Storage Migration Mechanism over WAN for Relocatable Virtual Machine Services on Clouds", 2009 IEEE, pp. 460-465.*

(Continued)

*Primary Examiner* — Van H Nguyen
(74) *Attorney, Agent, or Firm* — Seppo Laine Oy

(57) ABSTRACT

There is provided system for migrating virtual machines. The system is capable of managing virtual machines in a source service for hosting one or more source virtual machines and a destination service for hosting one or more destination virtual machines, and memory for storing program code and at least one processing core capable of executing the program code to cause generating, by the source service, a temporary virtual machine in the source service, attaching, by the source service, at least one storage drive of at least one source virtual machine, to the temporary virtual machine, preparing, by the temporary virtual machine, a disk image of the attached at least one storage drive in a format supported by the destination service, and writing, by the temporary virtual machine, the disk image to a storage drive of the destination virtual machine.

10 Claims, 3 Drawing Sheets

(56) References Cited

U.S. PATENT DOCUMENTS

| | | | |
|---|---|---|---|
| 8,527,466 B2 * | 9/2013 | Frank | G06F 9/45558 707/650 |
| 8,863,124 B1 | 10/2014 | Aron | |
| 8,898,668 B1 * | 11/2014 | Costea | G06F 9/45558 709/203 |
| 9,460,028 B1 | 10/2016 | Raizen et al. | |
| 9,588,796 B2 * | 3/2017 | Tarasuk-Levin | G06F 16/273 |
| 9,959,177 B2 * | 5/2018 | Simoncelli | G06F 11/1456 |
| 2016/0224572 A1 | 8/2016 | Le et al. | |

OTHER PUBLICATIONS

Ashino et al "Virtual Machine Migration Method between Different Hypervisor Implementations and its Evaluation", 2012 IEEE, pp. 1089-1094.*

Lu et al "Clique Migration: Affinity Grouping of Virtual Machines for Inter-Cloud Live Migration", 2014 IEEE, pp. 216-225.*

* cited by examiner

MIGRATING VIRTUAL MACHINES

FIELD

The present disclosure relates to migrating virtual machines between a source service and a destination service for hosting virtual machines.

BACKGROUND

Migration of virtual machine usually takes two to five hours. Tools may be installed to the virtual machine for making the migration faster. When more than one virtual machine is migrated, for example more than ten or a hundred, installing tools to the virtual machines to be migrated becomes a time consuming task. Moreover, the migration tools cause load to the virtual machine.

US 2016/0004467 A1 discloses technology by which a virtual hard disk is migrated from a source storage location to a target storage location without needing any shared physical storage, in which a machine may continue to use the virtual hard disk during migration. This facilitates use the virtual hard disk in conjunction with live-migrating a virtual machine. Virtual hard disk migration may occur fully before or after the virtual machine is migrated to the target host, or partially before and partially after virtual machine migration. Internal migration agents in source and target virtual machines communicate to handle the migration of data.

SUMMARY OF THE INVENTION

The invention is defined by the features of the independent claims. Some specific embodiments are defined in the dependent claims.

According to a first aspect of the present invention, there is provided a system for migrating virtual machines and capable of managing virtual machines in a source service for hosting one or more source virtual machines and a destination service for hosting one or more destination virtual machines, and memory for storing program code and at least one processing core capable of executing the program code to cause: generating, by the source service, a temporary virtual machine in the source service; attaching, by the source service, at least one storage drive of at least one source virtual machine, to the temporary virtual machine; preparing, by the temporary virtual machine, a disk image of the attached at least one storage drive in a format supported by the destination service; and writing, by the temporary virtual machine, the disk image to a storage drive of the destination virtual machine.

According to a second aspect of the present invention, there is provided a method for migrating virtual machines, comprising: managing virtual machines in a source service for hosting one or more source virtual machines and a destination service for hosting one or more destination virtual machines; generating, by the source service, a temporary virtual machine in the source service; attaching, by the source service, at least one storage drive of at least one source virtual machine, to the temporary virtual machine; preparing, by the temporary virtual machine, a disk image of the attached at least one storage drive in a format supported by the destination service; and writing, by the temporary virtual machine, the disk image to a storage drive of the destination virtual machine.

According to a third aspect of the present invention, there is provided a computer program configured to cause a method in accordance with a method the second aspect of the present invention.

Various embodiments of the first, second and third aspects may comprise at least one feature from the following bulleted list:

- a web-based user interface comprising at least one user interface element and selecting the user interface element cause selecting the destination service
- the web-based user interface comprises one or more user interface elements that in response to selection of user cause selecting source virtual machines to be migrated to a specific destination service or to determine a destination service on the basis of parameters for example geographical location, an amount of virtual machine resources, cost, migration time and/or migration date
- one or more user interface elements for source virtual machine selection, wherein selecting the user interface element for source virtual machine selection causes filtering virtual machines of the source hosting service for migrating a group of virtual machines to the destination hosting service
- the migration is performed at a time of low load of the source virtual machine
- virtual machine parameters for the source service and/or destination service are determined on the basis of user account information for the source and destination services
- the at least one storage drive of the source service is converted to a virtual hard drive file format of the destination service
- after migrating the virtual machine to the destination service, one or more of the following is performed:
    the at least one storage drive of the source service is detached from the temporary virtual machine;
    the at least one source virtual machine and the at least one storage drive are deleted; and/or
    the at least one storage drive is attached back to source virtual machine
- a notification indicating status of the migration is displayed or otherwise communicated to a user.

EMBODIMENTS

In connection with migrating virtual machines from a source service to a destination service a temporary virtual machine is generated in the source service. At least one storage drive of at least one source virtual machine is attached to the temporary virtual machine. The temporary virtual machine prepares a disk image of the attached at least one storage drive in a format supported by the destination service. The disk image is written to a storage drive of the destination virtual machine. In this way computational load to the source virtual machine may be kept low.

Figure 1:
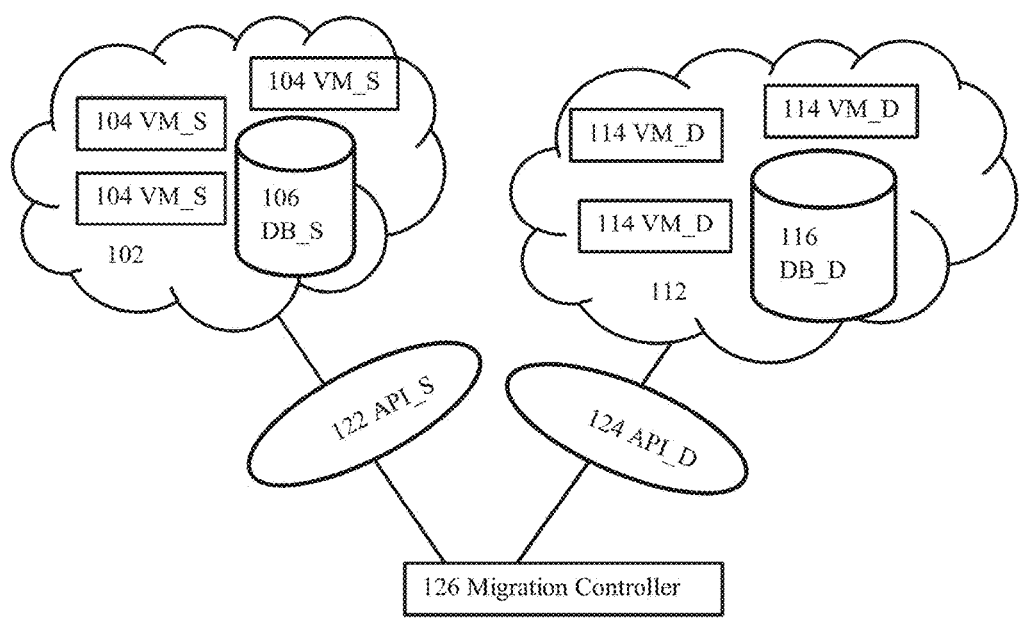
FIG. 1 illustrates example architecture for a system in accordance with at least some embodiments of the present invention.

FIG. 1 illustrates example architecture for a system in accordance with at least some embodiments of the present invention. The system may comprise at least two hosting services 102, 112 for virtual machines 104, 114. A hosting service may be a cloud, i.e. an internet-based computing service that provides shared computing resources and data storage to computers and other devices connected to internet. In cloud, the computing resources and data storage may be provided in third-party data centers that may be located geographically far from the user.

The hosting services may comprise application programming interfaces 122, 124 (APIs) via which the virtual machines may be managed by users of the hosting services. Examples of services provided by the APIs comprise generating virtual machines, generating storage drives in virtual machines, allocating processing resources to virtual machines and managing user information, attaching storage devices, detaching storage devices, data transfer to storage devices, for example.

A Virtual Machine (VM) provides a substitute for a real computer machine on hardware shared between many virtual machines managed by a hypervisor in the hosting service 102, 112. The virtual machine may have one or more storage drives for storing data, operating system and applications. The storage drives of VMs may be referred to as virtual hard drives (VHDs). VHDs allow multiple operating systems to reside on a single hosting machine and without partitioning a single hard disk into multiple drives. VHDs may be implemented as files in a VHD file format on a native file system. VHD files may be identified from the filename extension ".vhd". Examples of the VHD file format include a fixed VHD and a dynamic VHD supported by Microsoft Virtual PC and Virtual Server.

It should be appreciated that the hosting services may be different. The differences may be reflected in the VMs hosted by the hosting services, VHD file formats, the APIs and/or in user interfaces of the hosting services.

The hosting service 102, 112 may comprise a user database 106, 116 for storing information of users of the hosting service. The information in the user database may facilitate authentication of the users and invoicing users of the hosting services, for example.

A migration controller 126 may be connected to the hosting services over internet connections. The migration controller may be capable of causing to migrate virtual machines from one hosting service to another. The hosting service including the VM that is to be migrated may be referred to a source hosting service 102 and the virtual machine to be migrated may be referred to a source virtual machine 104. The hosting service, where the source VM is migrated may be referred to a destination hosting service 112 and a virtual machine in the destination hosting service may be referred to a destination virtual machine 114. The migration controller may be a computer or a virtual machine hosted by the source or destination hosting service or any other hosting service. Preferably, the migration controller is capable of providing a user interface to the user.

In migration of virtual machine (VM_S) from the source hosting service to the destination hosting service, a new virtual machine, the destination virtual machine (VM_D) is generated in the destination hosting service, data of the source virtual machine is copied to the destination virtual machine and the destination virtual machine takes over the tasks performed by the source virtual machine.

Figure 2:
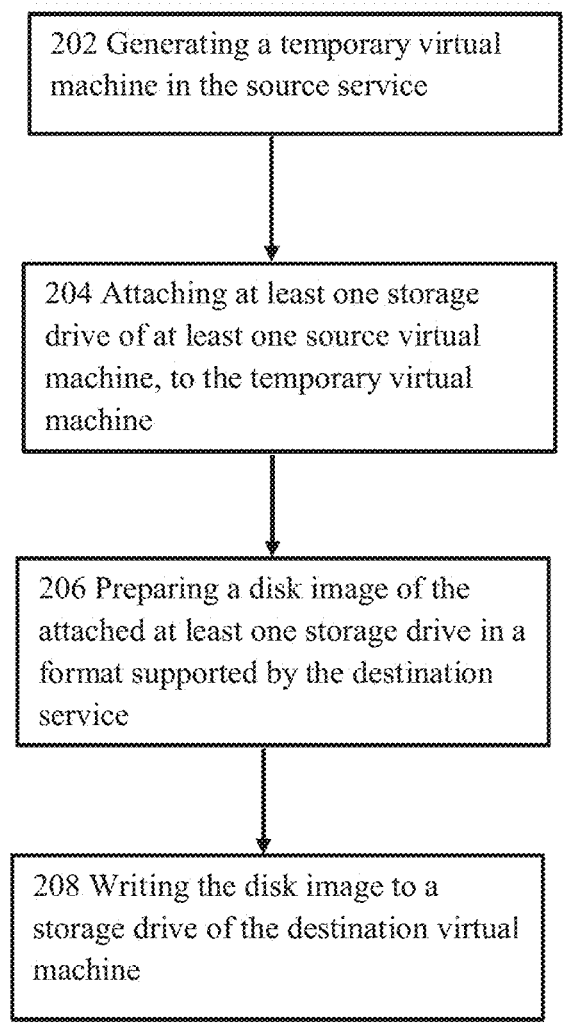
FIG. 2 is a flow graph of method in accordance with at least some embodiments of the present invention.

FIG. 2 is a flow graph of method in accordance with at least some embodiments of the present invention. The phases of the illustrated method may be caused directly or indirectly by an entity capable of generating one or more virtual machines in a source hosting service. The entity may be a migration controller in FIG. 1, capable of managing virtual machines in a source service for hosting one or more source virtual machines and a destination service for hosting one or more destination virtual machines, for example. The phases provide migrating virtual machines between the source hosting service and the destination hosting service.

Phase 202 comprises generating, by the source service, a temporary virtual machine in the source service. Phase 204 comprises attaching, by the source service, at least one storage drive of at least one source virtual machine, to the temporary virtual machine. Phase 206 comprises preparing, by the temporary virtual machine, a disk image of the attached at least one storage drive in a format supported by the destination hosting service. Phase 208 comprises writing, by the temporary virtual machine, the disk image to a storage drive of the destination virtual machine. In this way computational load to the source virtual machine may be kept low, when the source virtual machine is migrated to the destination hosting service.

It should be appreciated that information of the hosting services such as VHD file format used in the destination hosting service and/or configuration information of VMs may be available to the migration controller, or other entity, capable of managing virtual machines in the source hosting service and the destination hosting service. In an example the configuration information of VMs may comprise configuration templates for VMs. A configuration template may define properties of the VM for example by one or more of the following: a number of processing cores, processors, memory and storage drive size.

Figure 3:
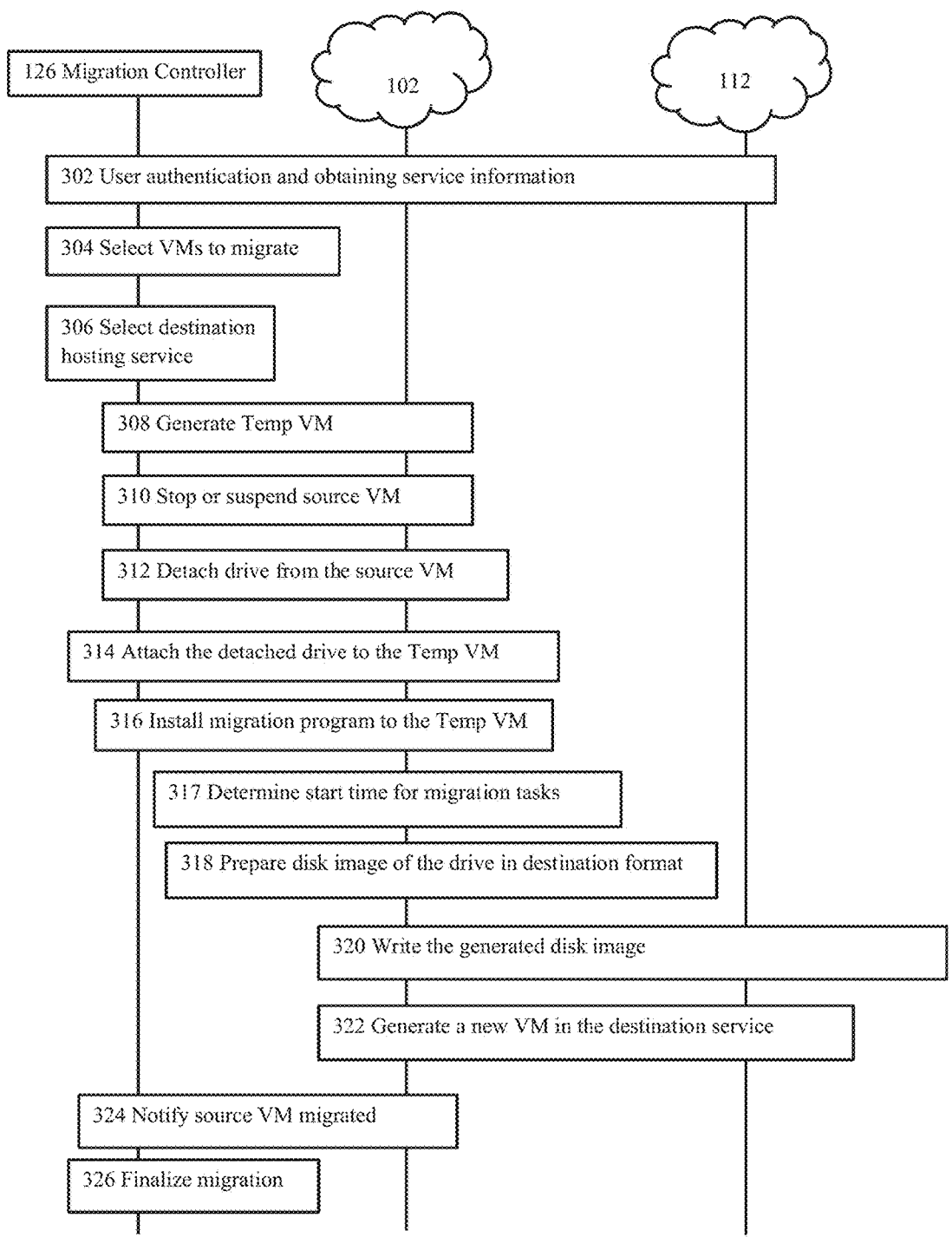
FIG. 3 is a sequence in accordance with at least some embodiments of the present invention.

FIG. 3 is a sequence in accordance with at least some embodiments of the present invention. The sequence includes functionalities performed by the source hosting service 102, the destination hosting service 112 and the migration controller 126 illustrated in FIG. 1. The functionalities may involve the entities that underlie the phases of FIG. 3.

Initially a user may have obtained a user account to both the source hosting service and the destination hosting service. In 302, the migration controller may authenticate the user to the hosting services. The authentication enables the migration controller to obtain information of the hosting services and virtual machines hosted by the hosting services. In this way virtual machine parameters for the source hosting service and/or destination hosting service may be determined on the basis of the user account information for the source and destination hosting services.

In an example information obtained from the hosting service may comprise size of compute units, memory blocks, virtual hard drive file format and virtual machine locations. In migration of a source virtual machine to a destination virtual machine, the parameters of the destination virtual machine may be determined to at least sufficiently match the parameters of the source virtual machine.

In one example of utilizing the user account information for the source and destination hosting services, the user may be authenticated to both hosting services by the migration controller since the user has credentials to both of the hosting services. Credentials of the user may be stored to the migration controller such that the migration controller may authenticate the user with the hosting services. The information of the hosting services may comprise VHD file format used in the destination hosting service and/or configuration information of VMs. The configuration information of VMs may comprise configuration templates for VMs.

A configuration template may define properties of the VM for example by one or more of the following: a number of processing cores, processors, memory and storage drive size.

In 304, one or more VMs of the source hosting service may be selected by the migration controller to be migrated to a destination hosting service. Available hosting services for serving as the destination hosting service may be determined on the basis of user account information. Accordingly, the available destination hosting services may comprise all the hosting services that the user has an account to.

In 306, the destination hosting service may be selected by the migration controller. The migration controller may provide a user interface via which the user may select the destination hosting service. The user interface may comprise user interface elements that may be selectable to the user for selecting the destination hosting service. The user interface elements may provide explicit selection of the destination hosting service, for example selecting the name of the destination hosting service. On the other hand the destination hosting service may be determined on the basis of parameters that may be selectable to the user via corresponding user interface elements. Examples of the parameters comprise a geographical location, an amount of virtual machine resources, cost, migration time and/or migration date. The destination hosting service may be selected from available destination hosting services determined on the basis of the parameters selected by the user. Examples of user interface comprise graphical user interfaces, where information such as text, graphics and video may be displayed to users in user interface elements. User interface elements may comprise drop-down menus and check boxes, for example. The user interface may be provided as a standalone application on the migration controller or the user interface may be a web-based user interface provided on an internet browser communicating with a server hosting the web-based user interface.

In an embodiment a web-based user interface is provided to a user. The web-based user interface may allow selecting 304 VMs of the source hosting service and/or selecting a destination hosting service. The web-based user interface may comprise at least one user interface element for destination hosting service selection (DHSS), and selecting the user interface element for DHSS may cause selecting 306 a destination hosting service for migrating the selected VM of the source hosting service. Alternatively or additionally, the web-based user interface may comprise one or more user interface elements for source VM selection (SVMS), and selecting the user interface element for SVMS may cause filtering VMs of the source hosting service. In this way a group of VMs of the source hosting service may be selected for migration to the destination hosting service. Filtering the VMs of the source hosting service may be particularly useful, when the number of VMs is large in the source hosting service. The VMs resulting from the filtering may be selected for migrating the selected VM of the source hosting service by user interface element for DHSS provided on the web-based user interface. It should be appreciated that when a group of VMs is selected for migration, migration of single VMs belonging to the group may be performed as described in various embodiments herein. In an embodiment, the destination hosting service may be selected 306 on a web-based user interface that comprises one or more user interface elements that in response to selection of the user cause selecting the source virtual machine to be migrated to a specific destination hosting service or to determine a destination hosting service on the basis of parameters for example geographical location, an amount of virtual machine resources, cost, migration time and/or migration date.

In an example of selecting 306 the destination hosting service on a web-based user interface, selecting user interface elements may cause filtering available destination hosting services on the basis of parameters selected by the user. The user may then select the destination hosting service from the filtered destination hosting services.

In 308, a temporary virtual machine (Temp VM) may be generated by the migration controller in the source hosting service similar to phase 202 in FIG. 2.

In 310 the source VM may be suspended or stopped by the migration controller. In this way the migration may be performed safely without corruption of data. In 314, a storage drive of the source virtual machine is attached to the temporary virtual machine by the migration controller similar to phase 204 in FIG. 2. It should be appreciated that the storage drive attached to the temporary virtual machine may be detached 312 by the migration controller prior to attaching 314 the storage drive to the temporary virtual machine.

In 316, a migration program may be installed to the temporary virtual machine by the migration controller. In this way the temporary virtual machine may be allocated tasks in migrating the source virtual machine to the destination virtual machine. The migration program may be generated by the migration controller on the basis of the obtained 302 information of the hosting services. The migration program may be configured to be executed at a specific migration time that is set on the basis of parameter selections obtained from the user.

In an example of generating the migration program, the migration program may be selected from a group of pre-generated migration programs on the basis of the obtained 302 information of the hosting services. Migration programs in the group of migration programs may be defined for migrating virtual machines having different virtual hard drive file formats. Accordingly, migration programs may be pre-defined for different combinations for source and destination hosting services which may use different virtual hard drive file formats.

In 317 a start time for migration tasks may be determined by the temporary virtual machine. Preferably the start time is determined to be the time, when the load of the source virtual machine is low. The time of low load may be for example night time. In one example the temporary virtual machine may determine the migration time and/or migration date on the basis of parameter selections of the user regarding. These selections may be obtained from the migration program. In one example the temporary virtual machine may determine the start time on the basis of monitoring load of the source virtual machine.

It should be appreciated that the migration time configured in the migration program or the migration time determined by monitoring the load of the source virtual machine may be used as the migration time. Moreover, prioritization may be applied to the migration times such that either the migration time determined by monitoring the load or the migration time configured in the migration program may be chosen to be applied if both are defined.

In 318, a disk image of the storage drive attached to the temporary virtual machine may be prepared by the temporary virtual machine. The disk image may be prepared similar to phase 206 in FIG. 2. The disk image may be prepared by utilizing the information of the hosting services obtained similar to described in 302. On the other hand the disk image may be prepared on the basis of information that is preconfigured in the migration program. In an example the source hosting service and the destination hosting service may have different virtual storage drive file formats. Accordingly, preparing the disk image may comprise converting the storage device into a raw image format. The raw image format may be converted to the virtual storage drive file format supported by the destination hosting service.

In 320 the prepared disk image may be written to a storage drive of the new virtual machine by the temporary virtual machine, similar as described in phase 208 in FIG. 2.

In 322 the new VM may be generated in the destination hosting service by the temporary virtual machine. The storage drive written in 320 may be attached to the new VM.

After the disk image has been written to the storage drive and the storage drive is attached to the new VM, the new VM in the destination hosting service may substitute the source VM in the source hosting service and the temporary virtual machine may notify 324 the migration controller that the source VM has been migrated. The notification may indicate status of the migration and be displayed or otherwise communicated to the user.

In 326, after the migration controller obtains information from the temporary virtual machine indicating that the source VM has been migrated, the migration controller may consider the migration complete. However, in an embodiment additionally one or more of the following is performed by the migration controller: the at least one storage drive of the source service is detached from the temporary virtual machine, the at least one source virtual machine and the at least one storage drive are deleted, and/or the at least one storage drive is attached back to source virtual machine. At least some of the above tasks performed after the source VM has been migrated provide that resources such as virtual machines and/or storage drives may be released. If the storage drive is attached back to the source VM, the source VM may be preserved for later use.

An embodiment may involve a migration program. The migration program may be a computer program. The migration program may comprise computer code or instructions. The migration program may be executed on a computer or virtual machine to cause one or more functionalities described in an embodiment.

An embodiment comprises a computer program configured to cause functionalities of a method or sequence according to an embodiment.

According to an embodiment there is provided a non-transitory computer readable medium having stored thereon a set of computer readable instructions that, when executed by at least one processor, cause to cause functionalities of a method or sequence according to an embodiment.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided to provide a thorough understanding of embodiments of the invention. One skilled in the relevant art will recognize, however, that the invention can be practiced without one or more of the specific details, or with other methods, components, materials, etc. In other instances, well-known structures or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

Acronyms List

API Application programming interface
DHSS Destination hosting service selection
VHD Virtual hard drive
VM Virtual machine
VM_D Destination virtual machine
VM_S Source virtual machine
SVMS Source VM selection
Temp VM Temporary virtual machine

| REFERENCE SIGNS LIST | |
| --- | --- |
| 102, 112 | Hosting services for hosting virtual machines |
| 104 | Virtual machine of source hosting service |
| 106, 116 | User database of hosting service |
| 122, 124 | Application programming interface of hosting service |
| 126 | Migration controller |
| 202-208 | Phases of the method of FIG. 2 |
| 302-326 | Phases of the sequence of FIG. 3 |

The invention claimed is:

1. A system for migrating virtual machines and capable of managing virtual machines in a source service for hosting source virtual machines and a destination service for hosting destination virtual machines, wherein the source virtual machines of the source service are migrated to destination virtual machines in the destination service such that the virtual machines of the source service are substituted with the destination virtual machines, wherein the system comprises a web-based user interface and memory for storing program code and at least one processing core capable of executing the program code to cause:
   filtering, in response to a first selection of the user on the web-based user interface, virtual machines of the source service for migrating a group of virtual machines from a source service to a destination service; and
   determining, in response to a second selection of the user on the web-based user interface, the destination service from available destination services on the basis of user account information and causing:
   a. generating, by the source service, temporary virtual machines for the group of virtual machines in the source service;
   b. attaching, by the source service, storage drives of the group of virtual machines, to the temporary virtual machines;
   c. preparing, by the temporary virtual machines, disk images of the attached storage drives in a format supported by the determined destination service; and
   d. writing, by the temporary virtual machines, the disk images to storage drives of the destination virtual machines of the determined destination service.

2. The system according to claim 1, wherein the web-based user interface comprises one or more user interface elements that in response to selection of user cause selecting source virtual machines to be migrated to a specific destination service or to determine a destination service on the basis of parameters for example geographical location, an amount of virtual machine resources, cost, migration time and/or migration date.

3. The system according to claim 1, wherein the migration is performed at a time of low load of the source virtual machine.

4. The system according to claim 1, wherein virtual machine parameters for the source service and/or destination service are determined on the basis of user account information for the source and destination services.

5. The system according to claim 1, wherein the at least one storage drive of the source service is converted to a virtual hard drive file format of the destination service.

6. The system according to claim 1, wherein after migrating the virtual machine to the destination service, one or more of the following is performed:
   the at least one storage drive of the source service is detached from the temporary virtual machine;
   the at least one source virtual machine and the at least one storage drive are deleted; and/or
   the at least one storage drive is attached back to source virtual machine.

7. The system according to claim 1, wherein a notification indicating status of the migration is displayed or otherwise communicated to a user.

8. The system according to claim 1, wherein a destination virtual machine takes over the tasks performed by a source virtual machine.

9. A method for migrating virtual machines, comprising:
   managing virtual machines in a source service for hosting source virtual machines and a destination service for hosting destination virtual machines;
   migrating the source virtual machines of the source service to destination virtual machines in the destination service such that the virtual machines of the source service are substituted with the destination virtual machines;
   filtering, in response to a first selection of the user on a web-based user interface, virtual machines of the source service for migrating a group of virtual machines to a destination service; and
   determining, in response to a second selection of the user on the web-based user interface, the destination service from available destination services on the basis of user account information and causing:
   a. generating, by the source service, temporary virtual machines for the group of virtual machines in the source service;
   b. attaching, by the source service, storage drives of the group of virtual machines, to the temporary virtual machines;
   c. preparing, by the temporary virtual machines, disk images of the attached storage drives in a format supported by the determined destination service; and
   d. writing, by the temporary virtual machines, the disk images to storage drives of the destination virtual machines of the determined destination service.

10. A computer program product comprising program code stored on a non-transitory computer readable medium, wherein the program code is arranged to perform a method, for migrating virtual machines when the computer program product is executed on a computer, the method comprising:
    managing virtual machines in a source service for hosting source virtual machines and a destination service for hosting destination virtual machines;
    migrating the source virtual machines of the source service to destination virtual machines in the destination service such that the virtual machines of the source service are substituted with the destination virtual machines;
    filtering, in response to a first selection of the user on a web-based user interface, virtual machines of the source service for migrating a group of virtual machines to a destination service; and
    determining, in response to a second selection of the user on the web-based user interface, the destination service from available destination services on the basis of user account information and causing:
    a. generating, by the source service, temporary virtual machines for the group of virtual machines in the source service;
    b. attaching, by the source service, storage drives of the group of virtual machines, to the temporary virtual machines,
    c. preparing, by the temporary virtual machines, disk images of the attached storage drives in a format supported by the determined destination service, and
    d. writing, by the temporary virtual machines, the disk images to storage drives of the destination virtual machines of the determined destination service.

* * * * *